United States Patent
Ishida et al.

(10) Patent No.: US 10,788,737 B2
(45) Date of Patent: Sep. 29, 2020

(54) IMAGING DEVICE AND CAMERA GRIP, AND IMAGING SYSTEM

(71) Applicant: SONY CORPORATION, Tokyo (JP)

(72) Inventors: Jun Ishida, Kanagawa (JP); Koji Izumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/284,700

(22) Filed: Feb. 25, 2019

(65) Prior Publication Data
US 2019/0187540 A1   Jun. 20, 2019

Related U.S. Application Data

(63) Continuation of application No. 15/580,389, filed as application No. PCT/JP2016/070866 on Jul. 14, 2016, now Pat. No. 10,254,633.

(30) Foreign Application Priority Data

Sep. 3, 2015   (JP) ................................. 2015-173820

(51) Int. Cl.
   *G03B 17/56*      (2006.01)
   *H04N 5/225*      (2006.01)
   (Continued)

(52) U.S. Cl.
   CPC ........... *G03B 17/563* (2013.01); *G03B 17/02* (2013.01); *G03B 17/14* (2013.01); *G03B 17/56* (2013.01);
   (Continued)

(58) Field of Classification Search
   CPC ........ G03B 17/56; F16M 11/04; F16M 11/12; F16M 11/10; F16M 11/18
   (Continued)

(56) References Cited

U.S. PATENT DOCUMENTS

| 2007/0166027 A1 * | 7/2007 | Misawa | G03B 17/02 396/529 |
| 2013/0108254 A1 * | 5/2013 | Iinuma | G03B 17/563 396/420 |

FOREIGN PATENT DOCUMENTS

| JP | 10-023306 | * | 1/1998 | ............. G03B 17/56 |
| JP | 10-23306 A | | 1/1998 | |
| JP | 2005-18171 A | | 7/2005 | |
| JP | 2005-181718 A | | 7/2005 | |

(Continued)

OTHER PUBLICATIONS

International Search Report issued in PCT/JP2016/070866 dated Oct. 11, 2016.

(Continued)

*Primary Examiner* — Clayton E. LaBalle
*Assistant Examiner* — Kevin C Butler
(74) *Attorney, Agent, or Firm* — Oblon, McClelland, Maier & Neustadt, L.L.P.

(57) ABSTRACT

A mount section 35 on which a camera grip 60 is mounted in an attachable and detachable manner is provided in an imaging device 30, and a mount section 65 that is mounted on the imaging device 30 in an attachable and detachable manner is provided in the camera grip. The attachment and detachment of the camera grip 60 can be easily performed and manipulability can be improved by providing the mount sections 35 and 65 provided in the imaging device and the camera grip with a bayonet mechanism. Further, a connection cable 75 that connects the imaging device 30 and the camera grip 60 is wound or rewound around the mount section 65 in accordance with the rotational movement of a grip main body section 61 with the mount section 65 as the axis, and the connection cable 75 does not become an obstacle to the switch manipulation of a manipulation section 62 provided in the camera grip 60. The manipulability of an imaging system can be improved.

20 Claims, 12 Drawing Sheets

(51) Int. Cl.
*G03B 17/02* (2006.01)
*G03B 17/14* (2006.01)
*F16M 11/04* (2006.01)
*F16M 11/18* (2006.01)
*F16M 11/12* (2006.01)
*F16M 11/10* (2006.01)

(52) U.S. Cl.
CPC ......... *H04N 5/2251* (2013.01); *H04N 5/2252* (2013.01); *H04N 5/2257* (2013.01); *F16M 11/04* (2013.01); *F16M 11/10* (2013.01); *F16M 11/12* (2013.01); *F16M 11/18* (2013.01)

(58) Field of Classification Search
USPC .......................................................... 396/428
See application file for complete search history.

(56) References Cited

FOREIGN PATENT DOCUMENTS

| JP | 2005181718 | * | 7/2005 | ............. G03B 17/02 |
| JP | 2007-194952 A | | 8/2007 | |
| JP | 2013-092678 A | | 5/2013 | |
| JP | 2013-92678 A | | 5/2013 | |

OTHER PUBLICATIONS

Chinese Office Action issued in Chinese Patent Application No. 2016-80048763 dated Mar. 30, 2020 citing documents AO and AP therein (w/English Translation).

Japanese Office Action issued in Japanese Patent Application No. 2017-537637 dated Apr. 28, 2020, citing documents AO-AR therein.

\* cited by examiner

10,788,737 B2

IMAGING DEVICE AND CAMERA GRIP, AND IMAGING SYSTEM

CROSS-REFERENCE TO RELATED APPLICATIONS

This application is a continuation of U.S. application Ser. No. 15/580,389 filed Dec. 7, 2017, the entire contents of which is incorporated herein by reference. U.S. application Ser. No. 15/580,389 is a 371 of International Application No. PCT/JP2016/070866 filed Jul. 14, 2016, and claims the benefit of priority from prior Japanese Application No. 2015-173820 filed Sep. 3, 2015.

TECHNICAL FIELD

This technology relates to an imaging device and a camera grip, and an imaging system, and enables an improvement in manipulability.

BACKGROUND ART

An imaging device has conventionally been provided with a camera grip that a user grasps at the time of imaging. For example, in Patent Literature 1, a mount section is provided in an imaging device and a camera grip, a male screw section is formed in the mount section of the imaging device and a female screw section is formed in the mount section of the camera grip, and the male screw section and the female screw section are screwed together; thereby, the camera grip is attached to the imaging device. Further, a pin jack is provided at the center of the mount section of the imaging device, and a pin plug for electrical communication is provided at the center of the camera grip; if the male screw section and the female screw section are screwed together, a state where the pin plug for electrical communication is inserted in the pin jack is created. Thus, the imaging device and the camera grip can be electrically connected by attaching the camera grip to the imaging device.

CITATION LIST

Patent Literature

Patent Literature 1: JP 2013-092678A

DISCLOSURE OF INVENTION

Technical Problem

Incidentally, in a configuration in which a male screw section is formed in one of an imaging device and a camera grip and a female screw section is formed in the other, the manipulation of screwing the male screw section and the female screw section together is needed in a case where the imaging device and the camera grip are linked. Therefore, the attachment and detachment of the camera grip to the imaging device cannot be performed quickly and easily. Further, a pin plug and a pin jack are provided at the centers of the mount sections; hence, in order to use the pin jack provided in the imaging device for another accessory or the like, it is necessary to detach the camera grip from the imaging device, and manipulability is worsened.

Thus, an object of this technology is to provide an imaging device and a camera grip, and an imaging system that can improve manipulability.

Solution to Problem

A first aspect of the present technology provides an imaging device, including a mount section configured to mount a camera grip in an attachable and detachable manner on a device main body, in which the mount section has a bayonet mechanism.

In this technology, a mount section using a bayonet mechanism is provided in the device main body of the imaging device, and the camera grip is mounted on the mount section in an attachable and detachable manner. Further, the cable direction in the device main body of a connection cable that connects the device main body and the camera grip is set to a tangential direction to the mount section. For example, a jack for connecting a connection cable is provided on a surface of the device main body on which the mount section is provided, and the insertion and removal direction of a plug to the jack is set such that the cable direction of the connection cable equipped with the plug is the direction of an upper tangent line to the mount section. Further, a chrysanthemum-shaped metal fixture is provided in the interior of the mount section and a threaded hole that fixes an accessory is provided at the center of the chrysanthemum-shaped metal fixture so that another accessory can be connected in place of the camera grip.

A second aspect of the present technology provides a camera grip, including a mount section for mounting a grip main body section on an imaging device in an attachable and detachable manner, the mount section being provided to protrude from the grip main body section, in which the mount section has a bayonet mechanism.

In this technology, a mount section using a bayonet mechanism is provided in the grip main body section of the camera grip so as to protrude from the grip main body section, and the imaging device is mounted on the mount section in an attachable and detachable manner. Further, the grip main body section is rotationally movable with the mount section as the axis. Furthermore, a cable guide section that regulates the position of a connection cable that connects the grip main body section and the imaging device to a direction winding around the mount section is provided in the camera grip. For example, as the cable guide section, a cable guide protrusion section that is formed in a position distant a prescribed spacing from the edge of the mount section provided to protrude in a circular cylindrical shape from the grip main body section and that is formed in the circumferential direction of the mount section so as to protrude in the protrusion direction of the mount section, or a cable guide trench section formed in the circumferential direction of the mount section so as to have, as the trench width, the length from the edge of the mount section to a position distant a prescribed spacing is provided.

A third aspect of the present technology provides an imaging system including: an imaging device; and a camera grip, in which a mount section which mounts the camera grip in an attachable and detachable manner is provided in the imaging device, a mount section which mounts the imaging device in an attachable and detachable manner is provided in the camera grip, and the mount section provided in the imaging device and the mount section provided in the camera grip each have a bayonet mechanism.

In the imaging system of this technology, the imaging device and the camera grip are mounted in an attachable and detachable manner using a bayonet mechanism. Further, a grip main body section of the camera grip is rotationally movable with the mount section as the axis. In the imaging device, the cable direction of a connection cable that connects the imaging device and the camera grip is set to a tangential direction to the mount section. Further, a cable guide section that regulates the position of the connection cable to a direction winding around the mount section is provided in the camera grip. Here, in a state where the camera grip is mounted on the imaging device, the cable direction in the imaging device is set to a cable direction regulated by the cable guide section of the camera grip, and the connection cable is wound or rewind around the mount section in accordance with the rotational movement of the grip main body section.

Advantageous Effects of Invention

According to this technology, a mount section on which a camera grip is mounted in an attachable and detachable manner is provided in a device main body of an imaging device, and the mount section has a bayonet mechanism. Therefore, the attachment and detachment of the imaging device and the camera grip becomes easier and manipulability can be improved. Note that the effects described in the present specification are only examples and are not limitative ones, and further there may be additive effects.

MODE(S) FOR CARRYING OUT THE INVENTION

Hereinbelow, embodiments for implementing the present technology are described. Note that the description is given in the following order.
1. Overall configuration of imaging system
1-1. External configuration of imaging system
1-2. Functional configuration of imaging system
2. Configuration of mechanical connection between imaging device and camera grip
3. Configuration of electrical connection between imaging device and camera grip
4. Another configuration of mount section of imaging device <1. Overall Configuration of Imaging System>
[1-1. External Configuration of Imaging System]

Figure 1:
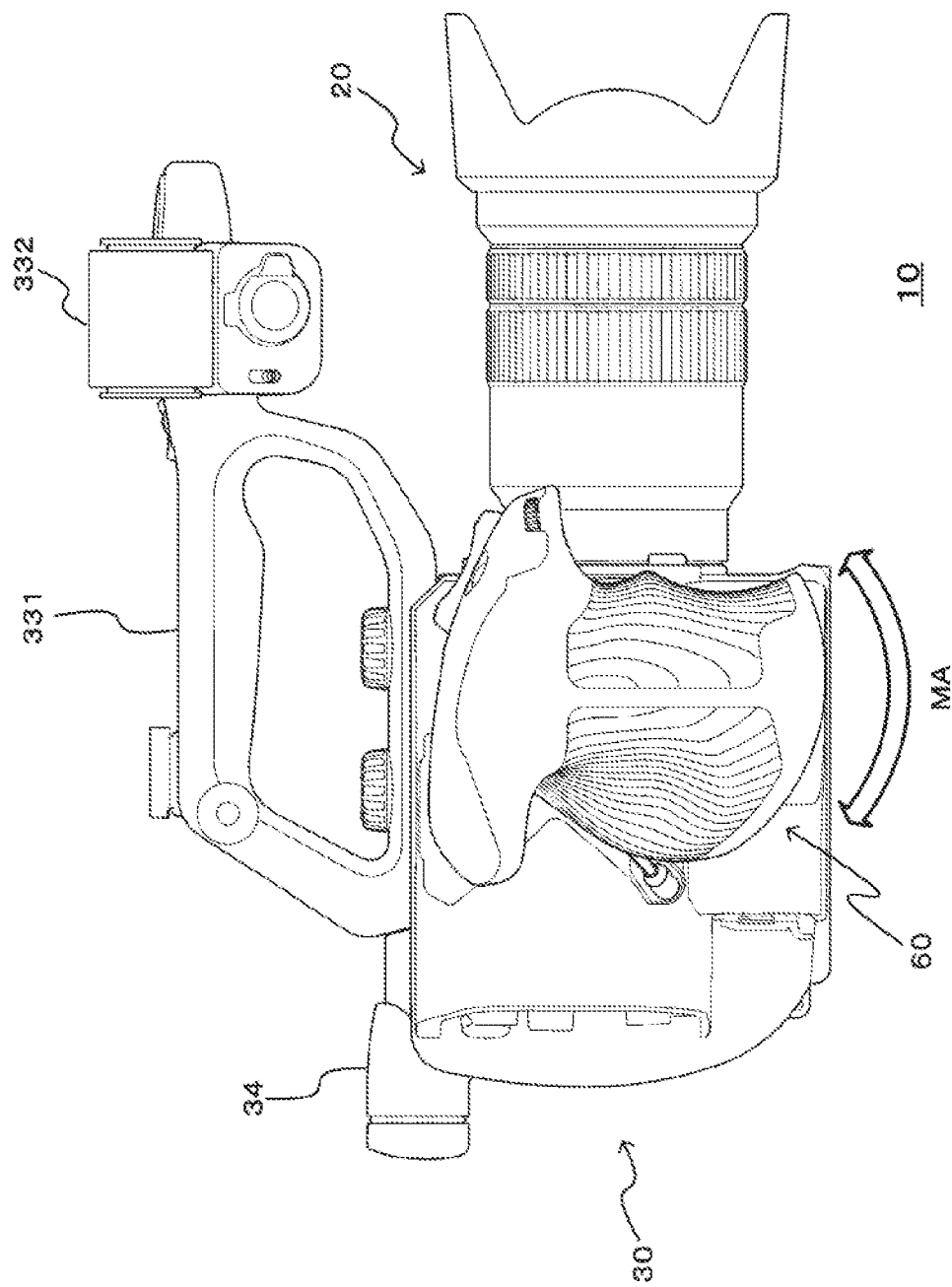
FIG. 1 is a right side view of an imaging system.
Figure 2:
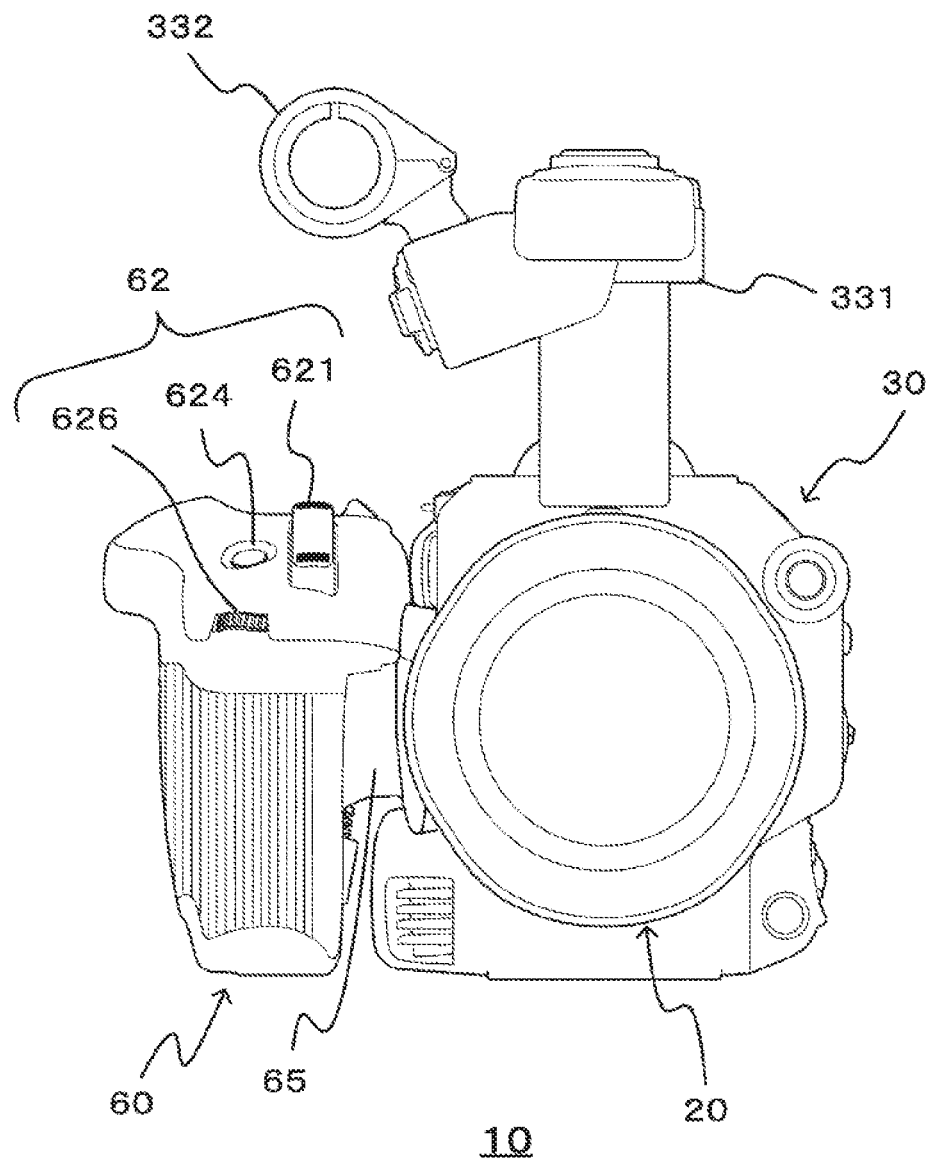
FIG. 2 is a front view of the imaging system.
Figure 3:
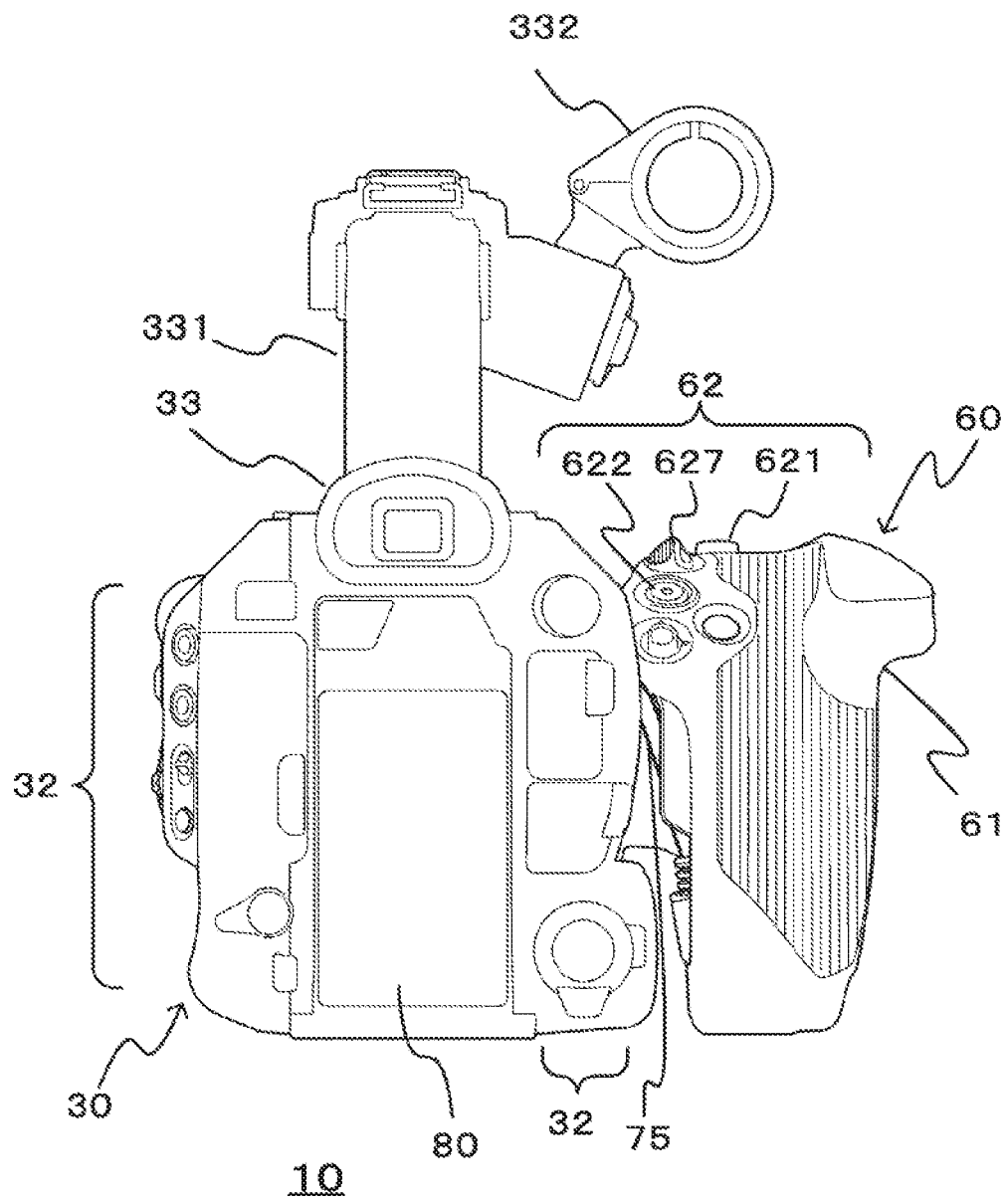
FIG. 3 is a back view of the imaging system.
Figure 4:
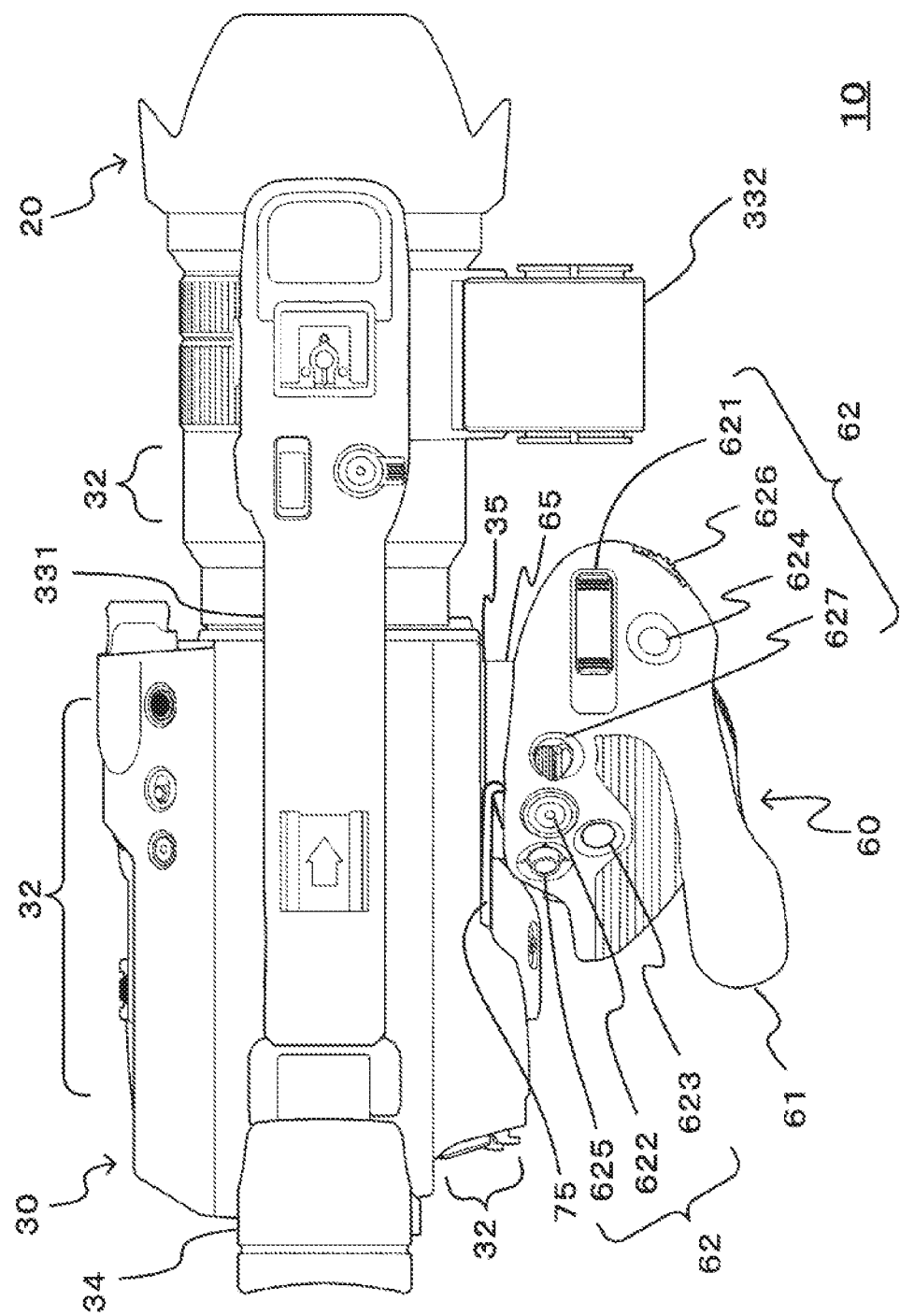
FIG. 4 is a plan view of the imaging system.

FIG. 1 to FIG. 4 illustrate external appearances of an imaging system of the present technology. Note that FIG. 1 is a right side view of the imaging system. FIG. 2 is a front view of the imaging system. FIG. 3 is a back view of the imaging system. FIG. 4 is a plan view of the imaging system.

An imaging system 10 includes a lens unit 20, an imaging device 30, and a camera grip 60. The camera grip 60 is provided in an attachable and detachable manner to the imaging device 30, and may be provided separately from the imaging device 30.

The lens unit 20 is attached to the front surface of the imaging device 30. The lens unit 20 includes an imaging lens that condenses light from a subject, a zoom mechanism that allows the optical magnification of the imaging lens to change in a prescribed range, etc.

A handle section 331 is formed on the upper surface of the imaging device 30. The handle section 331 is provided such that, when a user carries the imaging system 10 around or uses the imaging system 10 in a low position, the user can grip the handle section 331 with a hand to hold the imaging system 10. A microphone attachment section 332 is provided on the right side surface on the front end side of the handle section 331. A viewfinder section 34 is provided on the rear side of the upper surface of the imaging device 30. The viewfinder section 34 displays a camera-through image, an image recorded on a recording medium, a menu image, various pieces of information, etc.

A battery 80 that supplies electric power necessary to cause the imaging system 10 to operate is mounted on the rear surface of the imaging device 30. Further, a manipulation section 32 including various manipulation switches is provided on the upper surface, the left side surface, and the back surface of the imaging device 30.

A mount section 35 for attaching the camera grip 60 in an attachable and detachable manner is provided on the right side surface of the imaging device 30. Further, a jack that attaches a connection cable for electrically connecting the imaging device 30 and the camera grip 60 is provided in the vicinity of the mount section 35. Note that details of the mount section and the connection cable are described later.

The camera grip 60 includes a grip main body section 61 and a mount section 65. The grip main body section 61 is a portion that the user grasps, and is in a shape that can be easily grasped by the user's hand. In the grip main body section 61, a manipulation section 62 is provided in a position where it can be manipulated in a state where the user grasps the grip main body section 61. A zoom switch 621 that adjusts the focal distance and a REC button 622 that gives an instruction to start or end recording are provided in the manipulation section 62. Furthermore, as well as switches of which the function is fixed, assignable buttons 623 and 624 of which the function can be changed and a setting button 625 for assigning functions to assignable buttons and changing functions assigned to assignable buttons are provided in the manipulation section 62. Further, a jog dial 626 or the like for selecting functions etc. is provided in the manipulation section 62. Further, a lock release button 627 capable of adjusting the position of the grip main body section 61 with respect to the mount section 65 is provided in the grip main body section 61. Here, if the user performs lock release manipulation with the lock release button 627, the grip main body section 61 becomes rotationally movable in the direction of arrow MA with the mount section 65 as the axis; if lock release manipulation is then ended, the position of the grip main body section 61 is fixed at the rotational movement position at the time of the end. Therefore, if the lock release button 627 is manipulated in a state where the camera grip 60 is mounted on the imaging device 30, the position of the grip main body section 61 can be adjusted to a desired direction with respect to the imaging device 30.

Further, the grip main body section 61 is provided with a connection cable 75 for electrically connecting the grip main body section 61 to the imaging device 30. A plug is provided at the tip of the connection cable 75.

[1-2. Functional Configuration of Imaging System]

Figure 5:
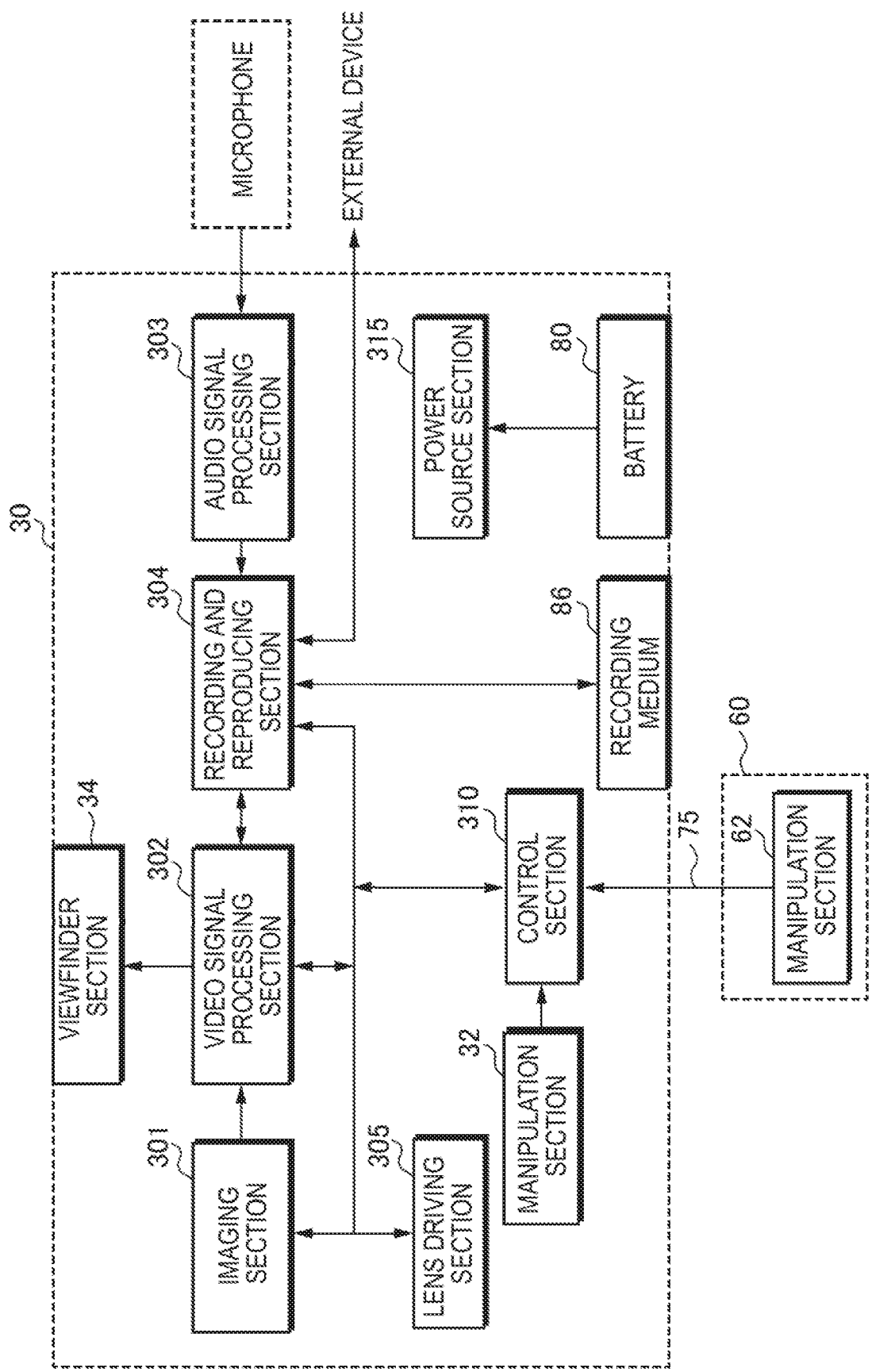
FIG. 5 is a diagram illustrating functional blocks of an imaging system.

FIG. 5 is a diagram illustrating functional blocks of an imaging system. The imaging device 30 includes an imaging section 301, a video signal processing section 302, an audio signal processing section 303, a recording and reproducing section 304, a lens driving section 305, a control section 310, a power source section 315, the manipulation section 32, the battery 80, a recording medium 86, etc. Further, the camera grip 60 includes the manipulation section 62, as described above.

The imaging section 301 includes, for example, an imaging element such as a complementary metal oxide semiconductor device (CMOS) or a charge-coupled device (CCD). The imaging section 301 photoelectrically converts an optical image that is formed on an imaging surface by the lens unit 20 and generates an imaging signal, and outputs the imaging signal to the video signal processing section 302.

The video signal processing section 302 performs, on an imaging signal, denoising processing, gain adjustment processing, and the processing of adjusting luminance and color. Further, the video signal processing section 302 performs processing that converts a video signal after adjustment processing and a video signal read by the recording and reproducing section 304 to a video signal corresponding to the number of pixels of the viewfinder section 34 and processing that superimposes a display signal of a menu display or the like on a video signal. Further, in order to obtain a desired captured image easily, the video signal processing section 302 may perform video image processing on a viewfinder image, such as enlarging and displaying a central portion. The video signal processing section 302 outputs a video signal after processing to the viewfinder section 34. The audio signal processing section 303 performs the processing of amplifying an audio signal generated by a microphone, etc., and outputs the amplified audio signal to the recording and reproducing section 304.

The recording and reproducing section 304 performs, on the basis of an instruction from the control section 310, the processing of recording an information signal such as a video signal or an audio signal on the recording medium 86 and the processing of reading and reproducing an information signal recorded on the recording medium 86. Further, the recording and reproducing section 304 performs the processing of supplying a video signal read from the recording medium 86 to the viewfinder section 34 via the video signal processing section 302, or the like. Furthermore, the recording and reproducing section 304 performs the processing of outputting an information signal in a prescribed format to an external device, or the like. Note that the recording medium 86 may be an attachable and detachable recording medium, or may be a recording medium fixedly provided in the interior of the imaging device 30.

The lens driving section 305 drives the lens unit 20 and sets the lens unit 20 to a desired zoom magnification on the basis of an instruction from the control section 310. Further, the lens driving section 305 may perform focus adjustment so that an optical image bonded to the imaging surface of the imaging element in the imaging section 301 is a clear image.

The manipulation section 32 includes manipulation switches provided on the side surface, the back surface, and the upper surface of the imaging device 30. The manipulation section 32 generates a manipulation signal in accordance with the user's switch manipulation, and outputs the manipulation signal to the control section 310. The manipulation section 62 includes manipulation switches provided in the grip main body section 61 of the camera grip 60. The manipulation section 62 is electrically connected to the imaging device 30 via the connection cable 75. The manipulation section 62 generates a manipulation signal in accordance with the user's switch manipulation, and outputs the manipulation signal to the control section 310.

The control section 310 includes, for example, a central processing unit (CPU), an electrically erasable programmable ROM (EEPROM), a read-only memory (ROM), a random access memory (RAM), etc., which are not illustrated. A program for executing various pieces of control processing in the control section 310 is stored in the ROM in the control section 310. The CPU operates on the basis of the program, and executes calculation and control processing necessary for each piece of control while using the RAM. The program is not limited to a case of being stored in a ROM incorporated in the imaging device 30 in advance; and may be stored in a removable recording medium and provided to the imaging device 30, or may be downloaded on the imaging device 30 via a network such as a LAN or the Internet.

The control section 310 controls each section on the basis of user manipulation or the like on the manipulation sections 32 and 62 so that an operation in accordance with the user manipulation is performed in the imaging system 10. The control section 310 turns on and off the power source of the imaging system 10 on the basis of, for example, user manipulation on a power supply switch. Further, the control section 310 controls the lens driving section 305 on the basis of user manipulation on a zoom switch, and causes the focal distance of the lens unit 20 to change in accordance with the user manipulation. Further, the control section 310 causes the recording of an information signal to be started or stopped on the basis of user manipulation on a REC button. Further, the control section 310 performs the control of executing a function assigned to a manipulated assignable button on the basis of user manipulation on the assignable button. Furthermore, the control section 310 assigns a function to an assignable button on the basis of user manipulation on a setting button. Note that, for example, a function of displaying various markers, a rec review function, a function of switching the mode of the viewfinder section, a viewfinder image switching function for facilitating focus adjustment, a function of displaying information regarding luminance, etc. are assignable to assignable buttons.

The power source section 315 supplies electric power from the battery 80 mounted on the imaging device 30 to each section of the imaging system 10.

<2. Configuration of Mechanical Connection Between Imaging Device and Camera Grip>

Figure 6:
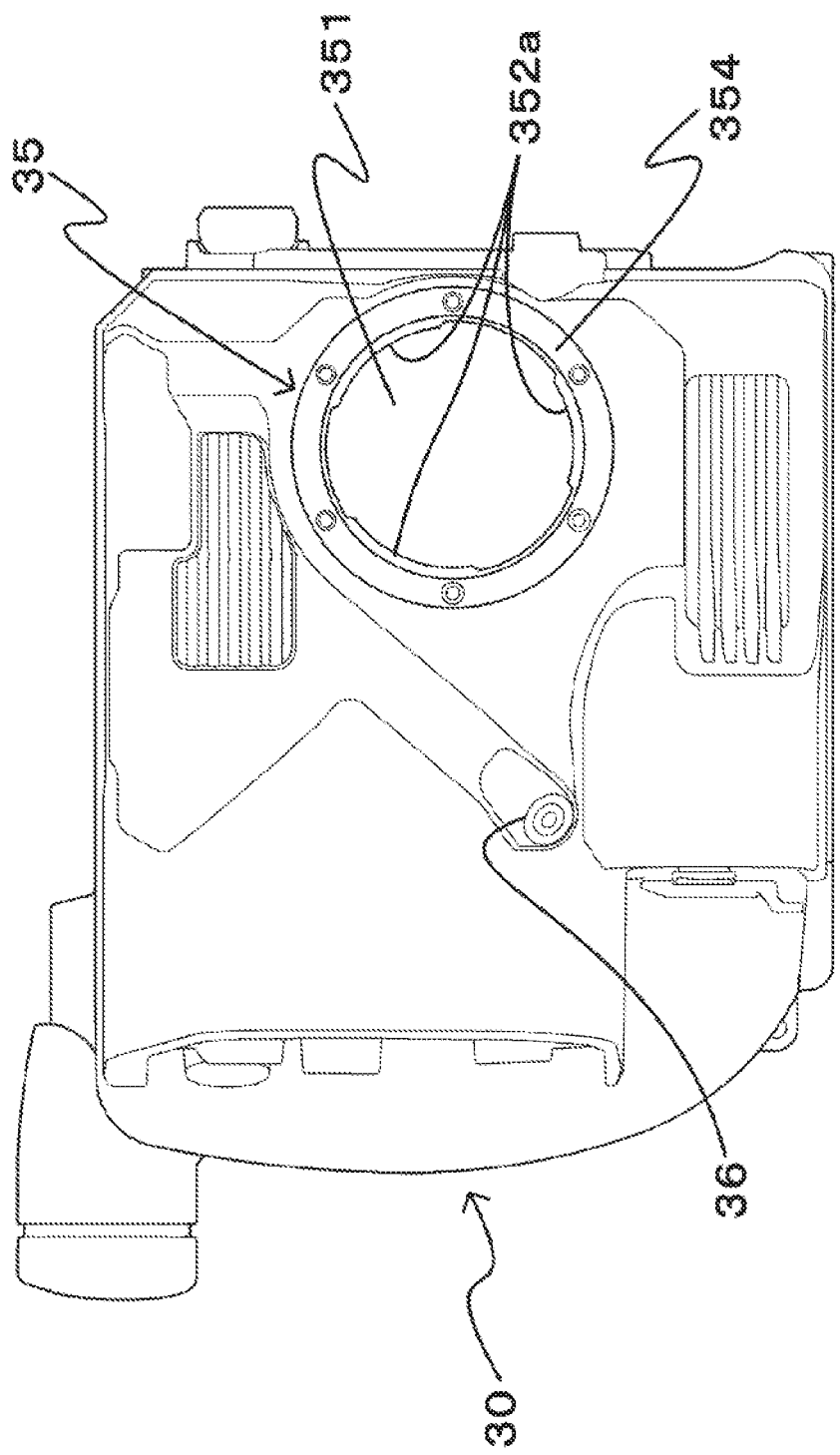
FIG. 6 is a diagram illustrating a mount section of an imaging device.
Figure 7:
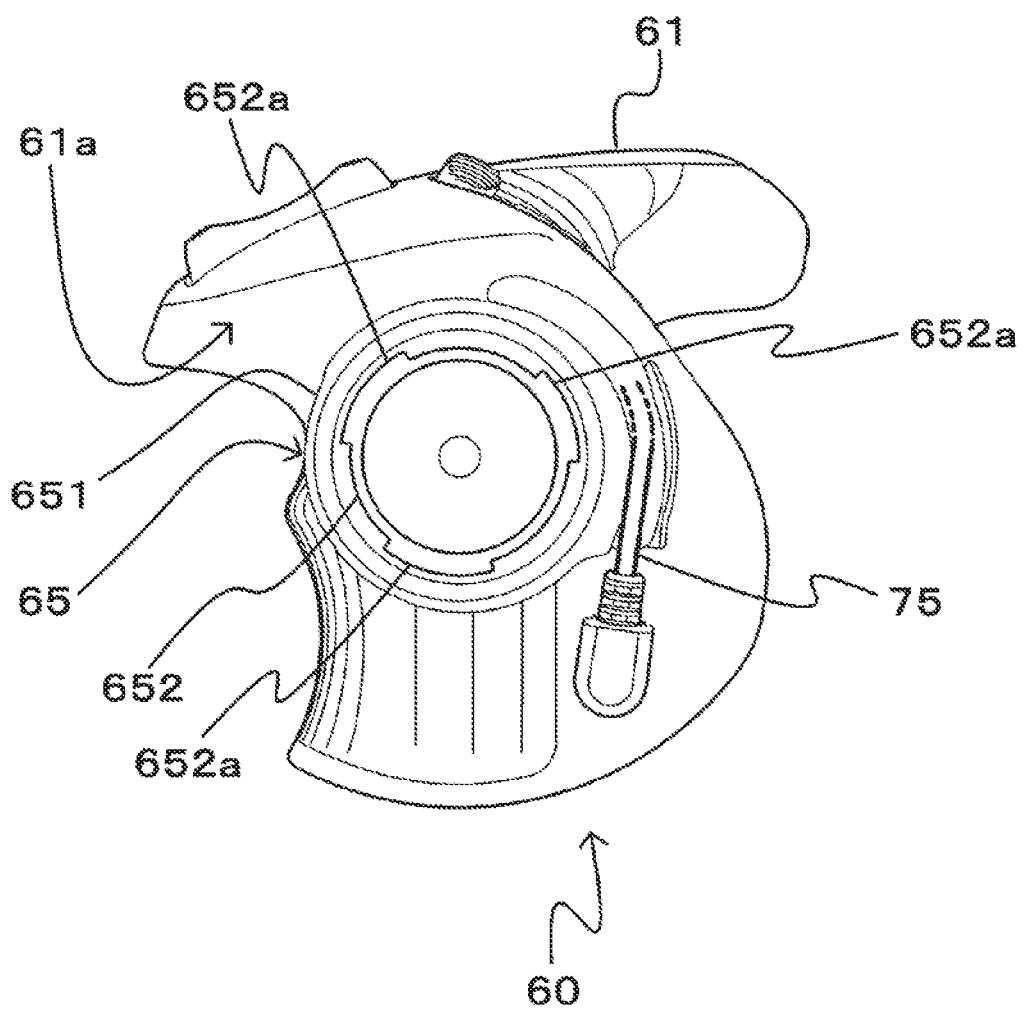
FIG. 7 is a diagram illustrating a mount section of a camera grip.
Figure 8:
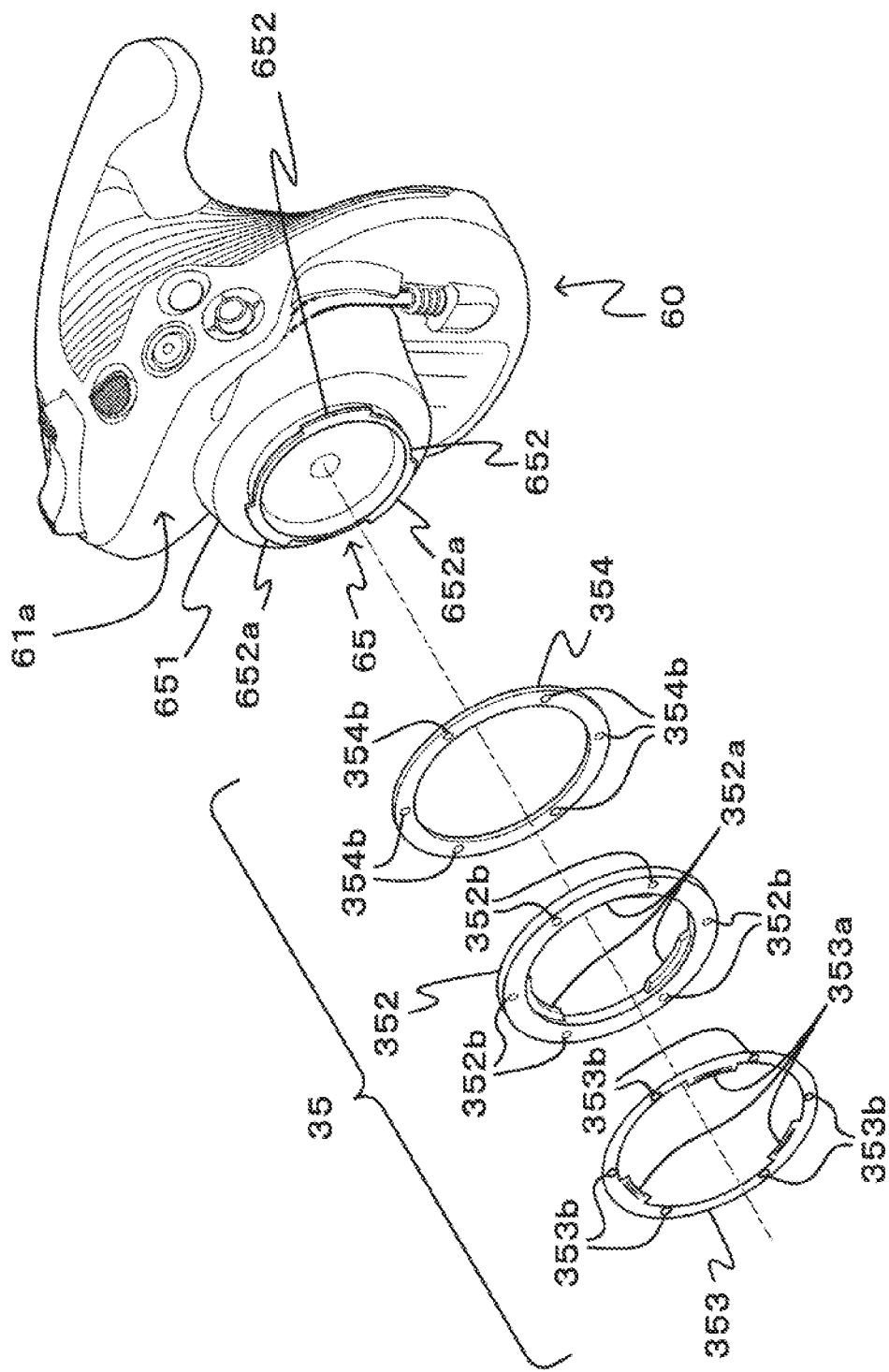
FIG. 8 is a diagram illustrating a disassembled perspective view of constituent elements including mount sections of an imaging device and a camera grip.

A mount section that connects the imaging device 30 and the camera grip 60 is provided in the imaging device 30 and the camera grip 60, and the mount section has a bayonet mechanism. FIG. 6 illustrates a mount section of an imaging device, and FIG. 7 illustrates a mount section of a camera grip. Further, FIG. 8 illustrates a disassembled perspective view of constituent elements configuring mount sections of an imaging device and a camera grip.

In the mount section 35 of the imaging device 30, a mount base section 352 in a ring shape is fitted to a circular concave section 351 formed on the right side surface. Bayonet tabs 352a are protrusively formed on the inner peripheral surface of the mount base section 352. Further, a leaf spring section 353 formed in a ring shape is provided between the bottom surface of the circular concave section 351 and the mount base section 352. On the inner peripheral side of the leaf spring section 353, elastic pieces 353a protruding toward the mount base section 352 are provided in positions facing the bayonet tabs 352a. The elastic pieces 353a bias bayonet tabs 652a of the mount section 65 inserted between the elastic pieces 353a and the bayonet tabs 352a so as to press the bayonet tabs 652a against the bayonet tabs 352a. An appearance ring 354 is provided on the outside surface of the mount base section 352 (the front surface of the circular concave section 351) in order to make the appearance of the mount section 35 better. Furthermore, threaded holes 352b, 353b, and 354b for stacking the mount base section 352, the leaf spring section 353, and the appearance ring 354 and fixing the mount base section 352, the leaf spring section 353, and the appearance ring 354 to the circular concave section 351 with a screw are provided in the mount base section 352, the leaf spring section 353, and the appearance ring 354, respectively.

The mount section 65 is provided on a facing surface 61a of the grip main body section 61 facing the imaging device 30. The mount section 65 includes a mount base section 651 in a circular cylindrical shape that protrudes from the facing surface 61a toward the imaging device and a mount main body section 652 in a circular cylindrical shape that is provided on the tip side of the mount base section 651. The bayonet tabs 652a are protrusively formed on the outer peripheral surface of a tip portion of the mount main body section 652. Note that the number of bayonet tabs in the mount sections 35 and 65 is not limited to three, and less than three or more than three bayonet tabs may be provided.

Further, in the mount section 35, a lock mechanism (not illustrated) is provided to regulate the rotation of the mount section 65 of the camera grip 60 with respect to the mount section 35 of the imaging device 30 when the camera grip 60 is mounted on the imaging device 30. Therefore, rotation of the mount section 65 relative to the mount section 35 during the manipulation of the camera grip 60 and falling off or the like of the camera grip 60 from the imaging device 30 can be prevented. As the lock mechanism, for example, a lock pin may be provided in the mount section 35, and an engagement hole may be provided in the mount main body section 652.

In a case where the camera grip 60 is mounted on the imaging device 30, the user sets the position of the bayonet tab 652a of the mount section 65 in the camera grip 60 between bayonet tabs 352a of the mount section 35 in the imaging device 30. Furthermore, in the state where the position is set, the user inserts the mount main body section 652 of the camera grip 60 into the circular concave section 351 of the imaging device 30. After that, the user rotates the mount main body section 652 of which the bayonet tabs 652a are inserted in prescribed positions that are positions on the deeper side than the bayonet tabs 352a, with the insertion direction as the rotation axis. In this event, the bayonet tab 652a is in a state of being engaged with (a state of overlapping with) the bayonet tab 352a, and a state where the mount section 35 and the mount section 65 are linked is created. That is, a state where the camera grip 60 is fixed to the imaging device 30 is created. Furthermore, the configuration is made such that, if the mount section 65 is rotated up to a prescribed position whereby the bayonet tab 652a and the bayonet tab 352a are engaged, the lock pin of the mount section 35 is inserted into the engagement hole of the mount main body section 652. By thus providing a lock mechanism, the mount section 65 of the camera grip 60 can be fixed to the mount section 35. Further, if the manipulation of pulling out the lock pin from the engagement hole is performed, the mount section 65 can be rotationally moved relative to the mount section 35, and the camera grip can be detached from the imaging device 30.

Thus, the attachment and detachment of the imaging device 30 and the camera grip 60 can be performed quickly and easily with the mount section having a bayonet structure. Further, by providing a lock mechanism in the above manner, the linkage state of the mount section 35 and the mount section 65 is maintained until lock release manipulation, such as user manipulation that releases the engagement state of the lock pin and the engagement hole, is performed. Therefore, the falling off and the like of the camera grip 60 from the imaging device 30 can be prevented with reliability.

Furthermore, since the elastic piece 353a of the leaf spring section 353 is biased so as to press the bayonet tab 652a against the bayonet tab 352a, the mount section 35 can hold the mount section 65 without causing unsteadiness or the like in a state where the bayonet tab 652a and the bayonet tab 352a are engaged.

Note that the mount sections 35 and 65 are not limited to a bayonet structure in which a bayonet tab is formed in each of the mount sections 35 and 65, and the mount section 35 and the mount section 65 are linked in a state where both bayonet tabs are engaged (overlap). For example, a bayonet structure in which a bayonet tab is formed in one mount section and an engagement section overlapping with the bayonet tab is provided in another mount section, and thereby the mount sections can be linked may be used.

<3. Configuration of Electrical Connection Between Imaging Device and Camera Grip>

The electrical connection between the imaging device and the camera grip in the imaging system is made using the connection cable 75, as described above. Further, the grip main body section 61 of the camera grip is provided in a rotationally movable manner in the direction of arrow MA of FIG. 1 with the mount section 65 as the axis. Hence, the imaging system 10 is provided such that, even if the position of the grip main body section 61 is changed with respect to the imaging device 30, the connection cable 75 does not become an obstacle to the switch manipulation of the grip main body section 61. For example, a situation where the connection cable 75 sags greatly and becomes an obstacle to switch manipulation etc. is avoided by providing the connection cable 75 such that the connection cable 75 is wound or rewound around the mount section 65 in accordance with the rotational movement in the direction of arrow MA of the grip main body section 61.

Figure 9:
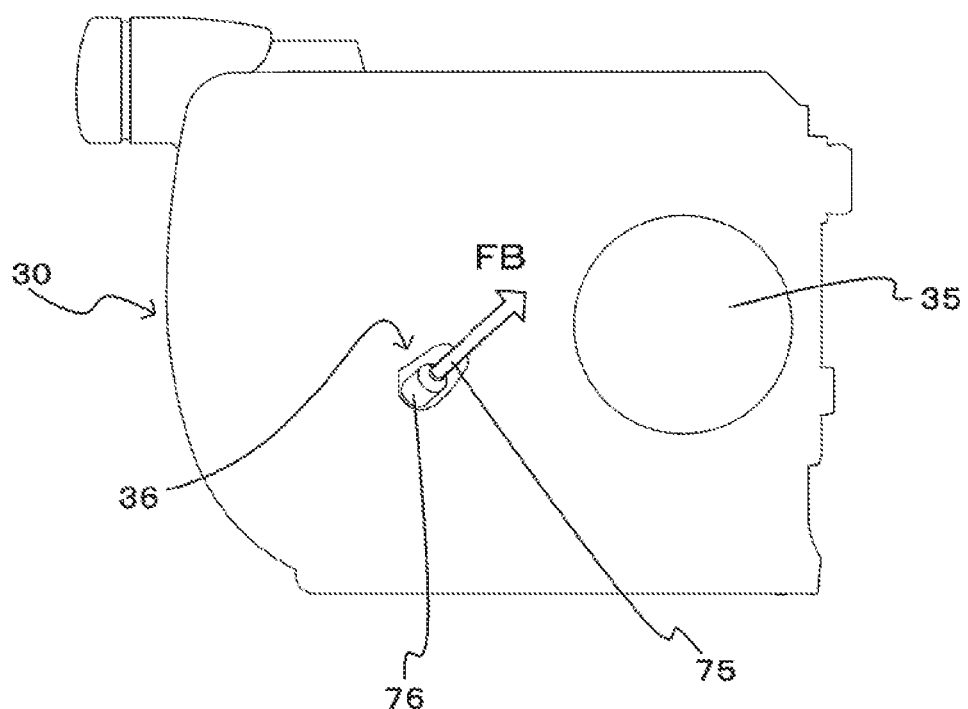
FIG. 9 is a diagram illustrating a cable arrangement in an imaging device.

FIG. 9 illustrates a cable arrangement in an imaging device. In the imaging device 30, the cable direction of the connection cable 75 is set to a tangential direction to the mount section 35. A jack 36 into which a plug 76 provided at the connection cable 75 is inserted is provided on the right side surface of the imaging device 30, which is a surface to be attached to the camera grip 60. Further, for the jack 36, the insertion and removal direction of the plug is set to the direction of arrow FB that causes the cable direction to be an upper tangent line to the mount section 35.

Figure 10:
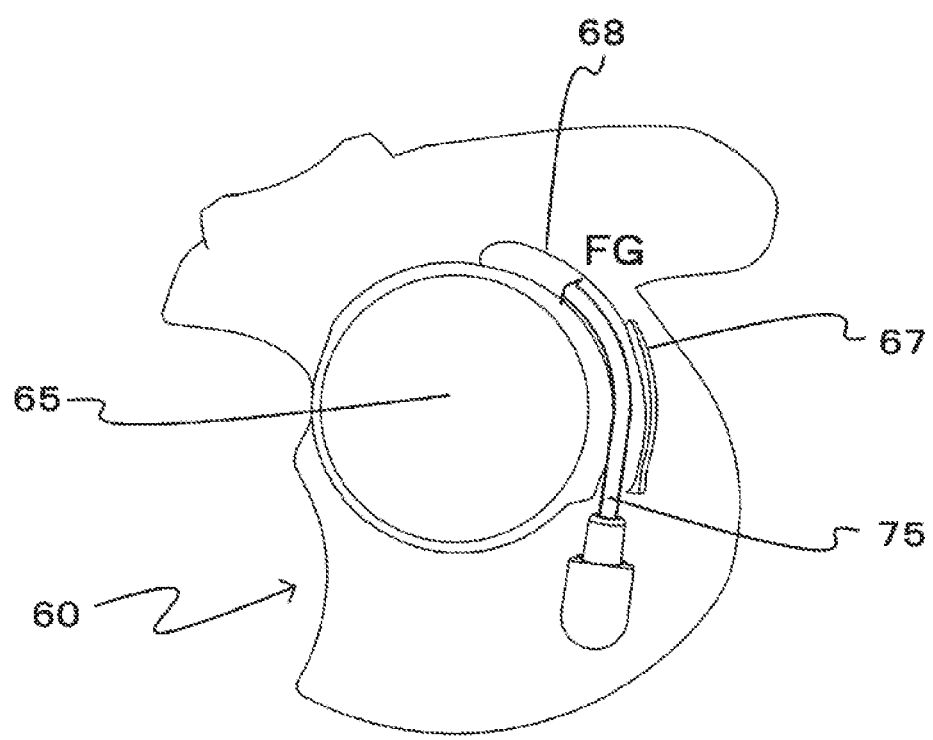
FIG. 10 is a diagram illustrating a cable arrangement in a camera grip.

FIG. 10 illustrates a cable arrangement in a camera grip. The connection cable 75 is drawn out from the facing surface 61a of the grip main body section 61 facing the imaging device. A cable guide section that regulates the position of the connection cable 75 to a direction winding around the mount section 65 is provided on the facing surface 61a. As the cable guide section, a cable guide protrusion section and/or a cable guide trench section is provided.

A cable guide protrusion section 67 is formed such that the position of the connection cable 75 is regulated to a winding direction FG with respect to the mount section 65 by the mount section 65 and the cable guide protrusion section 67. Specifically, the cable guide protrusion section 67 is formed in the circumferential direction of the mount section 65 in a position distant from the edge of the mount section 65 by a prescribed spacing in accordance with the thickness of the connection cable so as to protrude in the protrusion direction of the mount section 65. Further, a cable guide trench section 68 is formed in a portion that is around the mount base section 651 and that has a large amount of protrusion toward the imaging device. Specifically, the cable guide trench section 68 is formed in the circumferential direction of the mount section 65 so as to have, as the trench width, the length from the edge of the mount section 65 to a position distant a prescribed spacing in accordance with the thickness of the connection cable. Thus, the position of the connection cable 75 is regulated by the mount section 65, the cable guide protrusion section 67, and the cable guide trench section 68.

Figure 11:
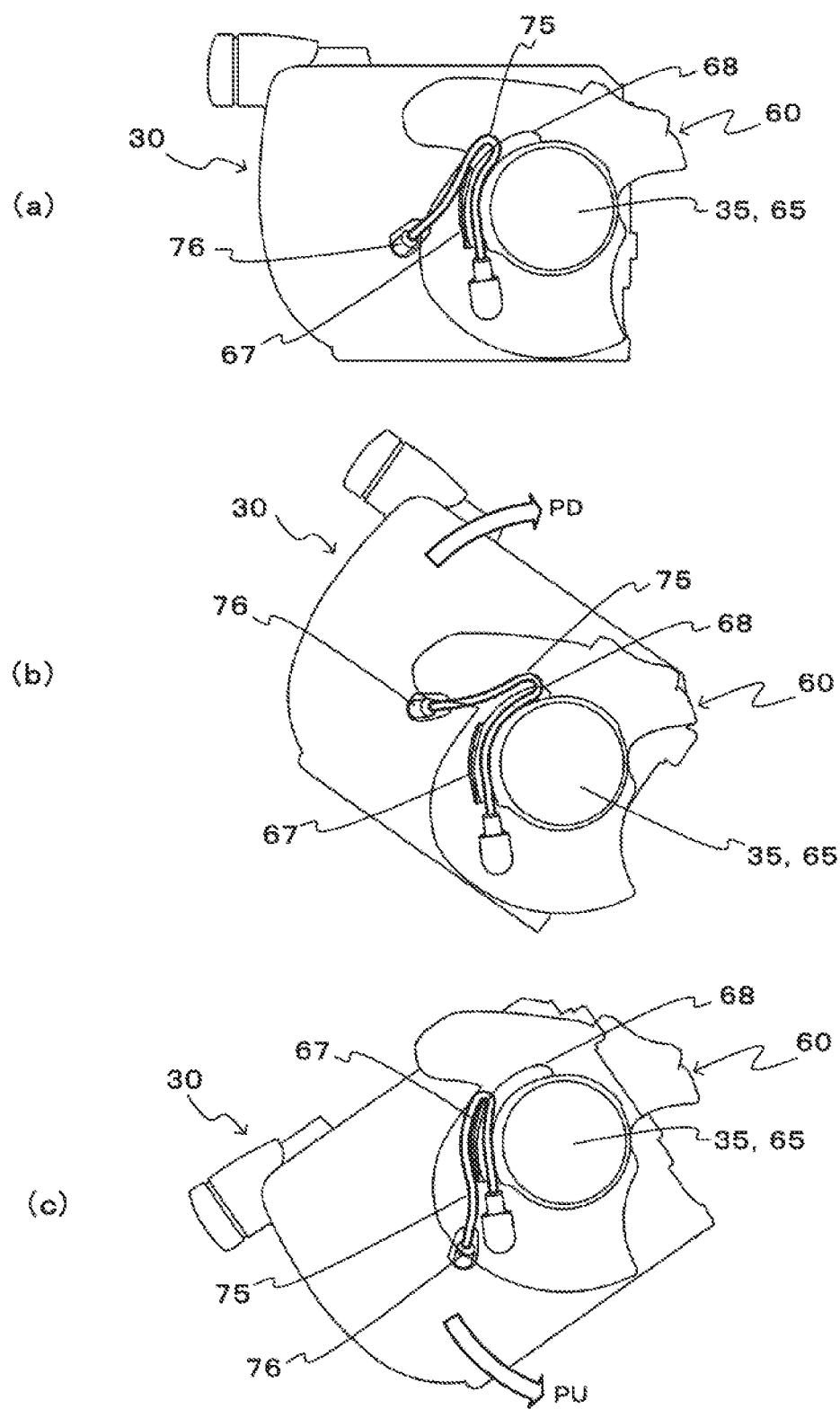
FIG. 11 is a diagram illustrating cases where the positional relationship between an imaging device and a camera grip is changed.

FIG. 11 illustrates cases where the positional relationship between the imaging device and the camera grip is changed. Note that (a) of FIG. 11 illustrates the position of the connection cable 75 in a case of an imaging position in which the imaging direction is, for example, the horizontal direction. (b) of FIG. 11 illustrates the position of the connection cable 75 in a case of an imaging position in which the imaging direction is the downward direction. (c) of FIG. 11 illustrates the position of the connection cable 75 in a case of an imaging position in which the imaging direction is the upward direction. The positional relationship between the imaging device 30 and the camera grip 60 can be changed by manipulating the lock release button 627 (see FIG. 4) of the camera grip 60. That is, if the user performs lock release manipulation with the lock release button 627, the grip main body section 61 becomes rotationally movable with the mount section 65 as the axis. Further, if the user ends lock release manipulation, the position of the grip main body section 61 is fixed at the rotational movement position at the time of the end. Here, in a case where the camera grip 60 is attached to the imaging device 30, the mount section 35 of the imaging device 30 and the mount section 65 of the camera grip 60 are fixed to each other. Thus, the positional relationship between the imaging device 30 and the camera grip 60 can be adjusted by manipulating the lock release button 627.

The imaging system 10 is provided such that, when the camera grip 60 is mounted on the imaging device 30, the cable direction in the imaging device 30 is a cable direction regulated by a cable position regulation section of the camera grip 60. Further, in the imaging system 10, the winding or rewinding of the connection cable 75 to the mount section 65 is performed in accordance with the rotational movement of the grip main body section 61; thereby, even if the positional relationship between the imaging device and the camera grip is changed, the connection cable 75 is prevented from sagging greatly.

For example, if the imaging device 30 is rotated in the direction of arrow PD relative to the camera grip 60 and the imaging direction is changed from the horizontal direction to the downward direction, also the position of the plug 76 inserted in the jack moves in the direction of arrow PD, with the mount section 35 as the rotational movement axis. Here, if the plug 76 moves in the direction of arrow PD, the winding of the connection cable 75 to the mount section 65 becomes larger than in a case where the imaging direction is the horizontal direction, and the connection cable 75 does not sag greatly.

Further, if the imaging device 30 is rotated in the direction of arrow PU relative to the camera grip 60 and the imaging direction is changed from the horizontal direction to the upward direction, also the position of the plug 76 inserted in the jack moves in the direction of arrow PU, with the mount section 35 as the rotational movement axis. Here, if the plug 76 moves in the direction of arrow PU, the connection cable 75 is rewound from the mount section 65. Therefore, the imaging device 30 and the camera grip 60 can be connected without the connection cable 75 sagging greatly.

Thus, in a case where the positional relationship between the imaging device 30 and the camera grip 60 is changed in the rotational movement direction MA, the winding or rewinding of the connection cable 75 to the mount section 65 is performed in accordance with the change in the positional relationship, and the connection cable 75 can be prevented from sagging greatly. Therefore, the connection cable 75 does not become an obstacle to the user's switch manipulation etc., and the manipulability of the imaging device can be kept good regardless of the change in the imaging position.

<4. Another Configuration of Mount Section of Imaging Device>

It is noted that, in some accessories used for an imaging device, an attachment surface includes a chrysanthemum-shaped metal fixture (a rosette surface). Further, also a chrysanthemum-shaped metal fixture adapter or the like in which one surface is a chrysanthemum-shaped metal fixture and a section for attaching an accessory is provided on the other surface side, and the like are used.

Figure 12:
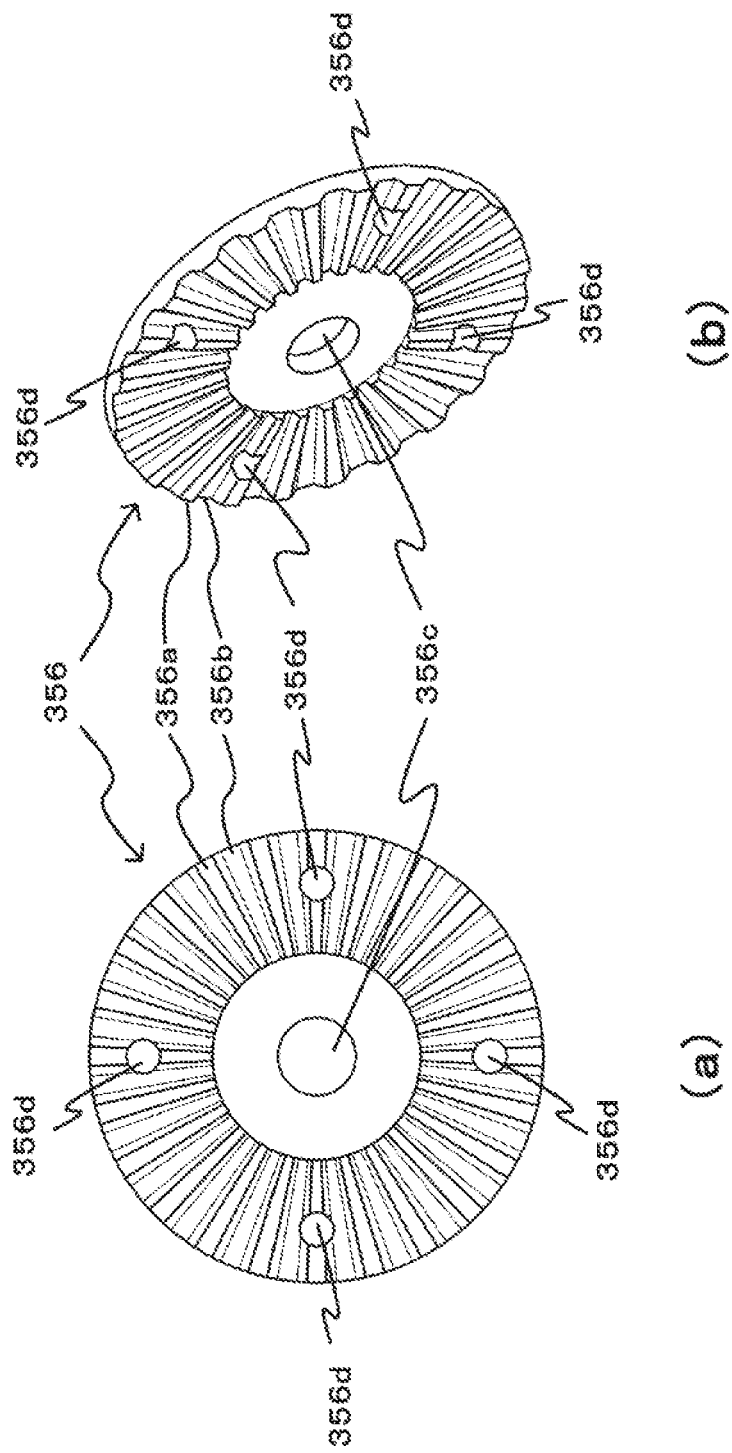
FIG. 12 is a diagram for describing a chrysanthemum-shaped metal fixture.

FIG. 12 is a diagram for describing a chrysanthemum-shaped metal fixture. Note that (a) of FIG. 12 shows a front view and (b) of FIG. 12 shows a perspective view. A chrysanthemum-shaped metal fixture 356 includes a plurality of convex surfaces 356a and a plurality of concave surfaces 356b extending radially from the center of a bearing surface. Further, an insertion hole 356c through which a fixing screw for fixing, to an imaging device, an accessory or the like equipped with a chrysanthemum-shaped metal fixture is inserted is formed in a central portion of the bearing surface. Furthermore, attachment holes 356d for attaching the chrysanthemum-shaped metal fixture 356 to the main body of an accessory or the like are provided in the chrysanthemum-shaped metal fixture 356.

Figure 13:
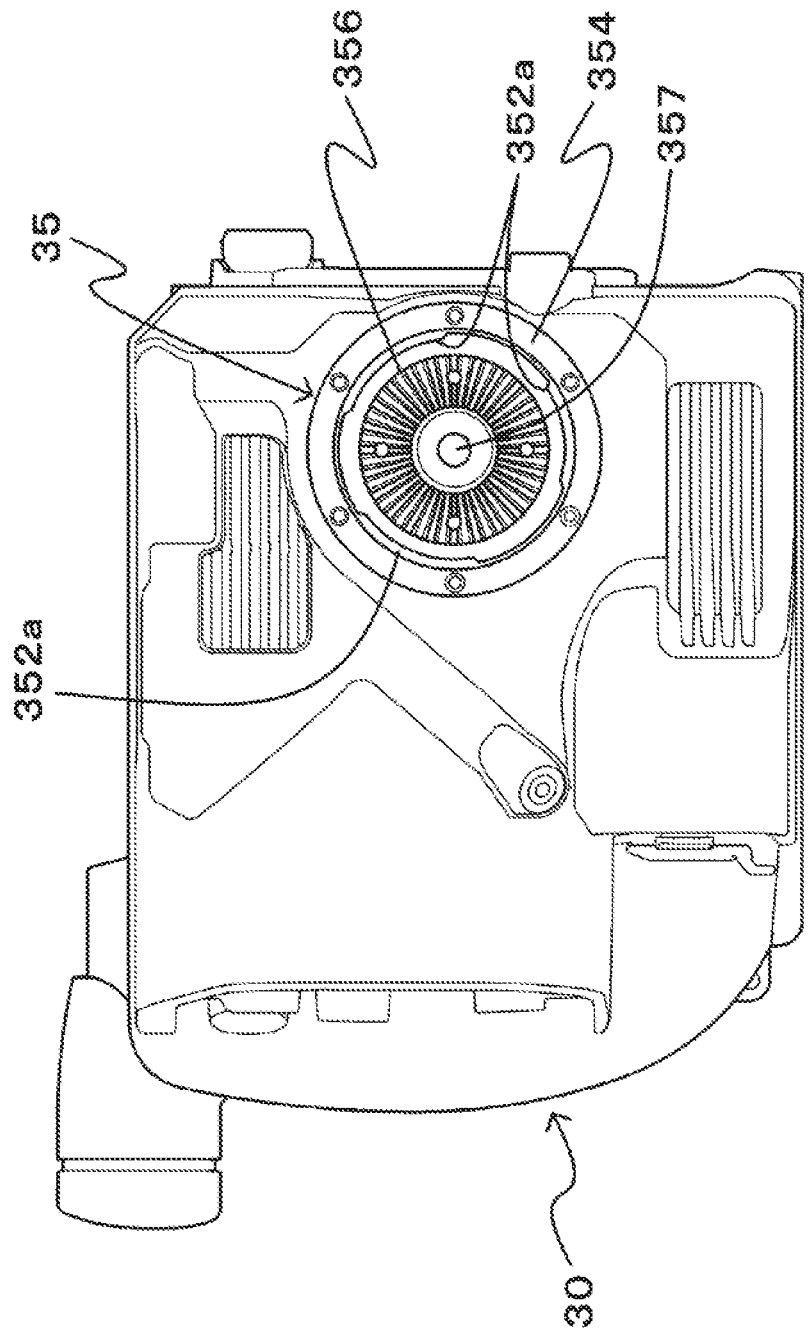
FIG. 13 is a diagram illustrating another configuration of the mount section of the imaging device.

In another configuration of the mount section 35 of the imaging device 30, a case where an accessory or the like in which an attachment surface is provided with a chrysanthemum-shaped metal fixture can be attached in place of the camera grip 60 is described. FIG. 13 illustrates another configuration of the mount section of the imaging device. As described above, in the mount section 35 of the imaging device 30, the mount base section 352 in a ring-like shape is provided on the circular concave section 351 formed on the right side surface. The bayonet tabs 352a are protrusively formed on the inner peripheral surface of the mount base section 352. Further, the leaf spring section 353 formed in a ring-like shape is provided between the circular concave section 351 and the mount base section 352, and the appearance ring 354 is provided on the outside surface of the mount base section 352. Furthermore, the chrysanthemum-shaped metal fixture 356 is provided at the center of the bottom surface of the interior of the mount section 35, that is, the circular concave section 351. Further, a threaded hole for fixation 357 for fixing an accessory or the like to the imaging device is formed at the center of the chrysanthemum-shaped metal fixture 356.

If the mount section 35 is formed in this way, an accessory or the like including a chrysanthemum-shaped metal fixture can be attached in a case where the camera grip 60 is detached from the imaging device 30. Specifically, the chrysanthemum-shaped metal fixture 356 of the mount section 35 and a chrysanthemum-shaped metal fixture provided on an attachment surface of an accessory or the like are faced to each other, and a fixing screw provided at the center of the chrysanthemum-shaped metal fixture in the accessory or the like is screwed into the threaded hole for fixation 357 of the mount section 35. In this case, since the chrysanthemum-shaped metal fixtures face each other, the convex section of one chrysanthemum-shaped metal fixture is fitted to the concave section of the other chrysanthemum-shaped metal fixture, and the imaging device and the accessory or the like can be fixed with reliability. Further, if the fixing screw is loosened to release the fitting state of the concave section and the convex section of the chrysanthemum-shaped metal fixtures, the accessory or the like becomes rotationally movable with the fixing screw as the rotation axis, and the accessory or the like can be changed to a desired position with respect to the imaging device.

Note that the effects described in the present specification are only examples and are not limitative ones, and there may be not-described additive effects. Further, the present technology should not be construed as being limited to the embodiments described above. The embodiments of this technology disclose the present technology in the form of examples, and it is self-evident that one skilled in the art can arrive at modifications and substitutions to embodiments without departing from the gist of the present technology. That is, the determination of the gist of the present technology requires taking the claims into consideration.

Additionally, the present technology may also be configured as below.

(1)
An imaging device, including
a mount section configured to mount a camera grip in an attachable and detachable manner on a device main body,
in which the mount section has a bayonet mechanism.

(2)
The imaging device according to (1),
in which a cable direction in the device main body of a connection cable that connects the device main body and the camera grip is set to a tangential direction to the mount section.

(3)
The imaging device according to (1) or (2), further including
a jack for connecting the connection cable provided on a surface of the device main body on which the mount section is provided,
in which an insertion and removal direction of a plug to the jack is set to a direction that causes the cable direction of the connection cable to which the plug is attached to be an upper tangent line to the mount section.

(4)
The imaging device according to any one of (1) to (3), further including:

a chrysanthemum-shaped metal fixture provided in an interior of the mount section; and
a threaded hole for fixation provided at a center of the chrysanthemum-shaped metal fixture.

INDUSTRIAL APPLICABILITY

In an imaging device and a camera grip, and an imaging system of this technology, a mount section on which the camera grip is mounted in an attachable and detachable manner is provided in the imaging device, and a mount section on which the imaging device is mounted in an attachable and detachable manner is provided in the camera grip; and the mount sections each have a bayonet mechanism. Therefore, the attachment and detachment of the imaging device and the camera grip becomes easier and manipulability can be improved; thus, this technology is suitable for, for example, commercial video cameras and the like.

REFERENCE SIGNS LIST 10 imaging system
20 lens unit
30 imaging device
32 manipulation section
32, 62 manipulation section
35, 65 mount section
36 jack
34 viewfinder section
60 camera grip
61 grip main body section
61a facing surface
67 cable guide protrusion section
68 cable guide trench section
75 connection cable
76 plug
80 battery
351 circular concave section
352 mount base section
352a bayonet tab
352b, 353b, 354b, 356d attachment hole
353 leaf spring section
353a action section
354 appearance ring
356 chrysanthemum-shaped metal fixture
356a convex surface
356b concave surface
356c insertion hole
357 threaded hole for fixation
627 lock release button
651 mount base section
652 mount main body section

The invention claimed is:

1. An imaging system, comprising
a mount section configured to mount a camera grip in an attachable and detachable manner on a device main body; and
a cable regulating section configured to restrict a position of a connection cable that connects a camera grip main body section and the imaging device,
wherein the mount section has a bayonet mechanism to attach and detach the camera grip with the device main body, wherein the cable regulating section is positioned closer to a back side of the device main body than the bayonet mechanism is positioned to the back side of the device main body, and wherein the connection cable is configured to move along with a rotation of the grip main body.

2. The imaging system according to claim 1, wherein a main body section of the camera grip is rotationally movable with respect to the mount section with the mount section as an axis.

3. The imaging system according to claim 1, further comprising:
a lock release device configured to allow rotation of a grip main body section of the camera grip with respect to the mount section.

4. The imaging system according to claim 3, wherein the lock release device is provided with the grip main body section.

5. The imaging system according to claim 1, further comprising:
a jack for connecting the connection cable provided on a surface of the device main body on which the mount section is provided.

6. The imaging system according to claim 1, wherein a cable direction in the device main body of the connection cable that connects the device main body and the camera grip is set to a tangential direction to the mount section.

7. The imaging system according to claim 1, further comprising:
a chrysanthemum-shaped metal fixture provided in an interior of the mount section; and
a threaded hole for fixation provided at a center of the chrysanthemum-shaped metal fixture.

8. A camera grip, comprising
a mount section for mounting a grip main body section on an imaging device in an attachable and detachable manner; and
a cable regulating section configured to restrict a position of a connection cable that connects a camera grip main body section and the imaging device,
wherein the mount section has a bayonet mechanism to attach and detach the camera grip with the device main body,
wherein the cable regulating section is positioned closer to a back side of the imaging device than the bayonet mechanism is positioned to the back side of the imaging device, and
wherein the connection cable is configured to move along with a rotation of the grip main body.

9. The camera grip according to claim 8, wherein the grip main body section is rotationally movable with respect to the imaging device with the mount section as an axis.

10. The camera grip according to claim 8, further comprising:
a lock release device configured to allow rotation of a grip main body section of the camera grip with respect to the mount section.

11. The camera grip according to claim 10, wherein the lock release device is provided with the grip main body section.

12. The camera grip according to claim 8, wherein a mount section which mounts the camera grip in an attachable and detachable manner is provided in the imaging device and includes a bayonet mechanism.

13. The camera grip according to claim 8, wherein the mount section protrudes from the grip main body section.

14. An imaging system comprising:
an imaging device;
a camera grip; and
a cable regulating section configured to restrict a position of a connection cable that connects a camera grip main body section and the imaging device,
wherein a mount section which mounts the camera grip in an attachable and detachable manner is provided in the imaging device,
wherein a mount section which mounts the imaging device in an attachable and detachable manner is provided in the camera grip, and
wherein the mount section provided in the imaging device and the mount section provided in the camera grip each have a bayonet mechanism to attach and detach the camera grip with the imaging device,
wherein the cable regulating section is positioned closer to a back side of the imaging device than the bayonet mechanism is positioned to the back side of the imaging device, and
wherein the connection cable is configured to move along with a rotation of the camera grip.

15. The imaging system according to claim 14, further comprising:
a lock mechanism configured to secure the camera grip to the imaging device when the camera grip is attached to the imaging device.

16. The imaging system according to claim 15, wherein the lock mechanism is configured to be manipulated by a user to release an engagement state of the lock mechanism.

17. The imaging system according to claim 16, wherein the lock mechanism includes a lock pin provided in the mount section of the imaging device and an engagement hole provided in the mount section of the camera grip.

18. The imaging system according to claim 14, further comprising:
a lock release device configured to allow rotation of a grip main body section of the camera grip with respect to the mount section.

19. The imaging system according to claim 18, wherein the lock release device is provided with the grip main body section.

20. The imaging system according to claim 14, wherein the camera grip main body section is rotationally movable with the mount section as an axis.

* * * * *